No. 803,085. PATENTED OCT. 31, 1905.
G. P. ALTEN.
TIRE TIGHTENER.
APPLICATION FILED FEB. 9, 1905.
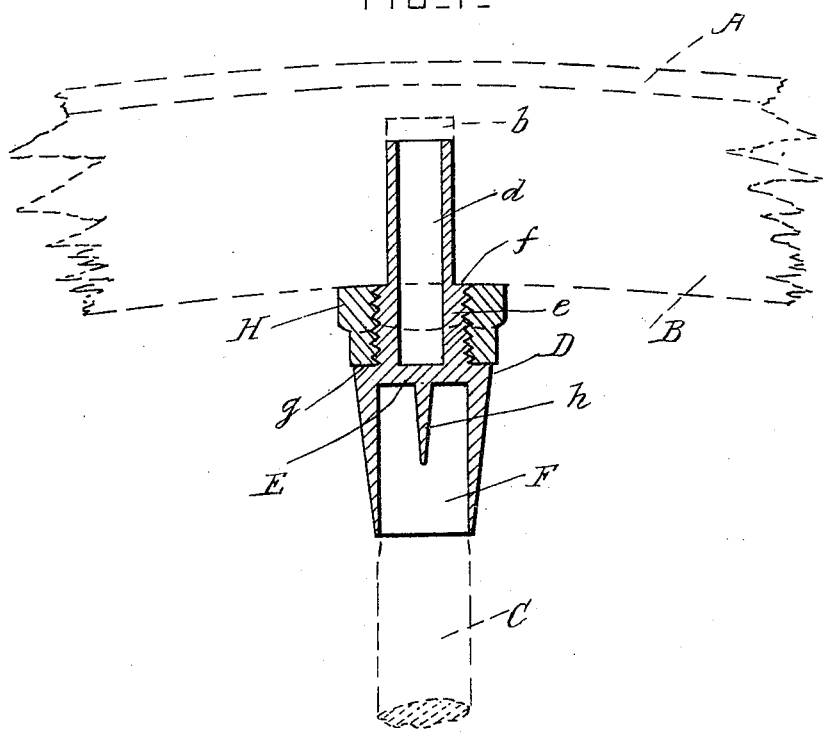
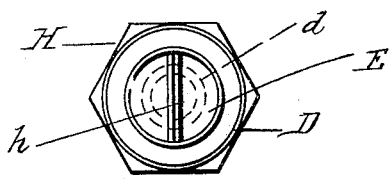
WITNESSES:
Walter Allen
H Joseph Doyle
INVENTOR
George P. Alten
BY
Herbert W. Jenner.
Attorney

UNITED STATES PATENT OFFICE.

GEORGE P. ALTEN, OF BARTLETT, TEXAS.

TIRE-TIGHTENER.

No. 803,085. Specification of Letters Patent. Patented Oct. 31, 1905.

Application filed February 9, 1905. Serial No. 244,975.

*To all whom it may concern:*

Be it known that I, GEORGE P. ALTEN, a citizen of the United States, residing at Bartlett, in the county of Williamson and State of Texas, have invented certain new and useful Improvements in Tire-Tighteners; and I do hereby declare the following to be a full, clear, and exact description of the invention, such as will enable others skilled in the art to which it appertains to make and use the same.

This invention relates to tire-tighteners which tighten the tire by expanding the felly of the wheel; and it consists in the novel features of construction hereinafter fully described and claimed.

In the drawings, Figure 1 is a longitudinal section through the tire-tightener. Fig. 2 is an end view of the tire-tightener.

A is a portion of a wheel-tire, and B is a portion of the wheel-felly, which is provided with a circular and radial hole $b$.

C is a portion of one of the spokes of the wheel.

All the spokes of the wheel are provided with tightening-sleeves according to this invention.

D is a tightening-sleeve provided with a tubular end portion $d$ and a screw-threaded portion $e$.

E is a partition plate or disk at the middle part of the sleeve, and F is a tubular socket at the other end of the sleeve from the said end portion $d$. The screw-threaded portion $e$ has a shoulder $f$, which normally bears against the felly, and the tubular portion $d$ is inserted into the radial hole $b$ of the felly. The periphery of the partition-disk forms a shoulder $g$, and $h$ is a rib inside the socket F. This rib engages with a slot in the end of the spoke C, the end portion of the said spoke being inserted into the said socket.

H is a nut which is screwed upon the screw-threaded portion $e$ and which also bears against the wheel-felly.

The partition-plate prevents any water from getting to the end of the spoke. When the tire is to be tightened, the nuts of the various sleeves are screwed against the felly, so as to expand the felly within the tire.

What I claim is—

In a tire-tightener, the combination, with a sleeve having a tubular socket for engaging with a spoke, a tubular end portion for engaging with a felly, a tubular screw-threaded portion at its middle part, a partition between the said tubular portions arranged at the junction of the said socket with the said screw-threaded portion, and an externally-projecting shoulder arranged in line with the said partition; of a tightening-nut engaging with the said screw-threaded portion of the sleeve and normally bearing against its said shoulder.

In testimony whereof I have affixed my signature in the presence of two witnesses.

GEO. P. ALTEN.

Witnesses:
E. C. AULBER,
C. A. CHRISTENSON.